United States Patent
Shimakage et al.

(10) Patent No.: US 6,778,890 B2
(45) Date of Patent: Aug. 17, 2004

(54) LANE-KEEPING CONTROL WITH STEERING TORQUE AS A CONTROL INPUT TO A VEHICLE STEERING SYSTEM

(75) Inventors: Masayasu Shimakage, Kanagawa (JP); Hiroshi Kawazoe, Kanagawa (JP); On Sadano, Kanagawa (JP); Shigeki Satou, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 154 days.

(21) Appl. No.: 10/220,305

(22) PCT Filed: Nov. 30, 2001

(86) PCT No.: PCT/JP01/10473
§ 371 (c)(1),
(2), (4) Date: Sep. 13, 2002

(87) PCT Pub. No.: WO02/47945
PCT Pub. Date: Jun. 20, 2002

(65) Prior Publication Data
US 2003/0078712 A1 Apr. 24, 2003

(30) Foreign Application Priority Data
Dec. 12, 2000 (JP) ....................................... 2000-377221

(51) Int. Cl.$^7$ ............................................... B62D 5/04
(52) U.S. Cl. ......................... 701/41; 701/301; 180/443; 180/446
(58) Field of Search ............................... 701/1, 41, 42, 701/43, 96, 301; 180/443, 446

(56) References Cited

U.S. PATENT DOCUMENTS 6,212,453 B1 * 4/2001 Kawagoe et al. ............. 701/41
6,256,561 B1 * 7/2001 Asanuma ..................... 701/41
6,324,452 B1 * 11/2001 Ikegaya ....................... 701/41
6,493,619 B2 * 12/2002 Kawazoe et al. ............. 701/41
6,708,098 B2 * 3/2004 Matsumoto et al. .......... 701/70
2003/0014162 A1 * 1/2003 Sadano ......................... 701/1
2003/0195684 A1 * 10/2003 Martens ....................... 701/41

FOREIGN PATENT DOCUMENTS

DE 199 11 892 A1 9/2000
JP 11-286280 10/1999

OTHER PUBLICATIONS

Patent Abstracts of Japan. vol. 2000, No. 01, Jan. 31, 2000 & JP 11 286280.
M. Shimakage et al., "Design of Lane-Keeping Control with Steering Torque Input for a Lane-Keeping Support System", SAE Technical Paper Series, Mar. 5–8, 2001, pp. 1–8.

* cited by examiner

Primary Examiner—Gary Chin
(74) Attorney, Agent, or Firm—Foley & Lardner LLP

(57) ABSTRACT

A method for lane-keeping control of a lane-keeping support system provides a current command indicative of steering torque assist needed to steer a vehicle in following a target line between lane markings on a roadway during driving in lane-keeping control (LKC) mode. A map has two sets of limit data against a range of values of lateral acceleration to which the vehicle is subject, between which sets of limit data there is a range of values of the command during various phases of steering the vehicle to turn in the LKC mode. In order to compensate for undesired effect caused by any deviation of the range of values of the current command due to the presence of continuous disturbance, the two sets of limit data are corrected. To determine driver steering intervention, the instantaneous value of the current command is compared to two limit values established out of the corrected two sets of limit data.

10 Claims, 16 Drawing Sheets

LANE-KEEPING CONTROL WITH STEERING TORQUE AS A CONTROL INPUT TO A VEHICLE STEERING SYSTEM

BACKGROUND OF THE INVENTION

The present invention relates to a lane-keeping control of a lane-keeping support system that is intended to assist the driver steering action.

Considerable research has been done in recent years on lane-keeping support (LKS) systems for reducing drivers' workload. Such a LKS system certainly assists a driver in steering a moving vehicle to track or follow a contrived centerline between lane markings of a roadway by applying a steering bias to a steering system of the vehicle. The steering bias is provided by a servo system, and it may either assist or oppose steering torque from the driver in lane-keeping control (LKC) mode. In order for the servo system to provide such a steering bias, it is the common practice to use the steering wheel angle as a control input to the servo system. This approach provides superior robustness because the non-linearity of steering system is compensated for. However, it does not readily allow driver steering intervention. The driver steering intervention may be recognized in various manners, and the recognition is accompanied by a transient control to allow smooth shift from LKC mode to normal driver control (NDC) mode.

In order to recognize such driver steering intervention, various methods have been previously known in the art. One such example is described in JP-A 11-286280, according to which, in LKC mode, an actual value of steering torque from the driver, detected at a torque sensor, is being compared to a threshold value. The threshold value is expressed as the product of a predetermined value and the maximum of the previously monitored actual values of steering torque from the driver in NDC mode. The driver steering intervention is recognized when the threshold value is exceeded. Another example, which is also described in JP-A 11-286280, is comparing a deviation between an actual value of steering angle, detected at a steering angle sensor, and a target value thereof to a threshold value. The target value indicates a steering angle with which a vehicle may be directed toward the contrived centerline between lane markings. The driver intervention is recognized when the threshold value is exceeded.

SUMMARY OF THE INVENTION

The above-mentioned technologies, however, posses their own distinct disadvantages. Comparing the actual value of steering torque to the threshold value requires the additional provision of a torque sensor. The addition of a torque sensor is difficult to suppress increase of cost and installation space. On other hand, comparing the deviation in steering angle to a threshold value, although it does not require a new sensor, has its disadvantage that the threshold value is difficult to set. This difficultly derives from the unlikelihood of occurrence of deviation due to the property of a servo control that the deviation in steering angle is reduced toward zero. Therefore, there is a need for an alternative approach to the recognition of driver intervention, which does not require a torque sensor and, therefore, is economical to install and maintain.

An object of the present invention is to provide for lane-keeping control, which satisfies the above-mentioned need.

This object has been achieved, according to the present invention, by a method for lane-keeping control of a lane-keeping support system for assisting the driver steering action of a vehicle in following a target line between lane markings on a roadway, the method comprising:

producing a command indicative of steering torque assist needed to steer a vehicle in following a target line between lane markings on a roadway during driving in lane-keeping control (LKC) mode;

providing a map having two sets of limit data against a range of values of lateral acceleration to which the vehicle is subject, between which sets of limit data there is a range of values of the command during various phases of steering the vehicle to turn in the LKC mode;

correcting the two sets of limit data in a manner to compensate for undesired effect caused by any deviation of the range of values of the command due to the presence of continuous disturbance; and comparing the instantaneous value of the command to two limit values established out of the corrected two sets of limit data in determining whether or not there is driver steering intervention.

BRIEF DESCRIPTION OF THE DRAWINGS

Further objects and advantages of the invention will be apparent from reading of the following description in conjunction with the accompanying drawings.

DESCRIPTION OF THE PREFERRED EMBODIMENTS

Figure 1:
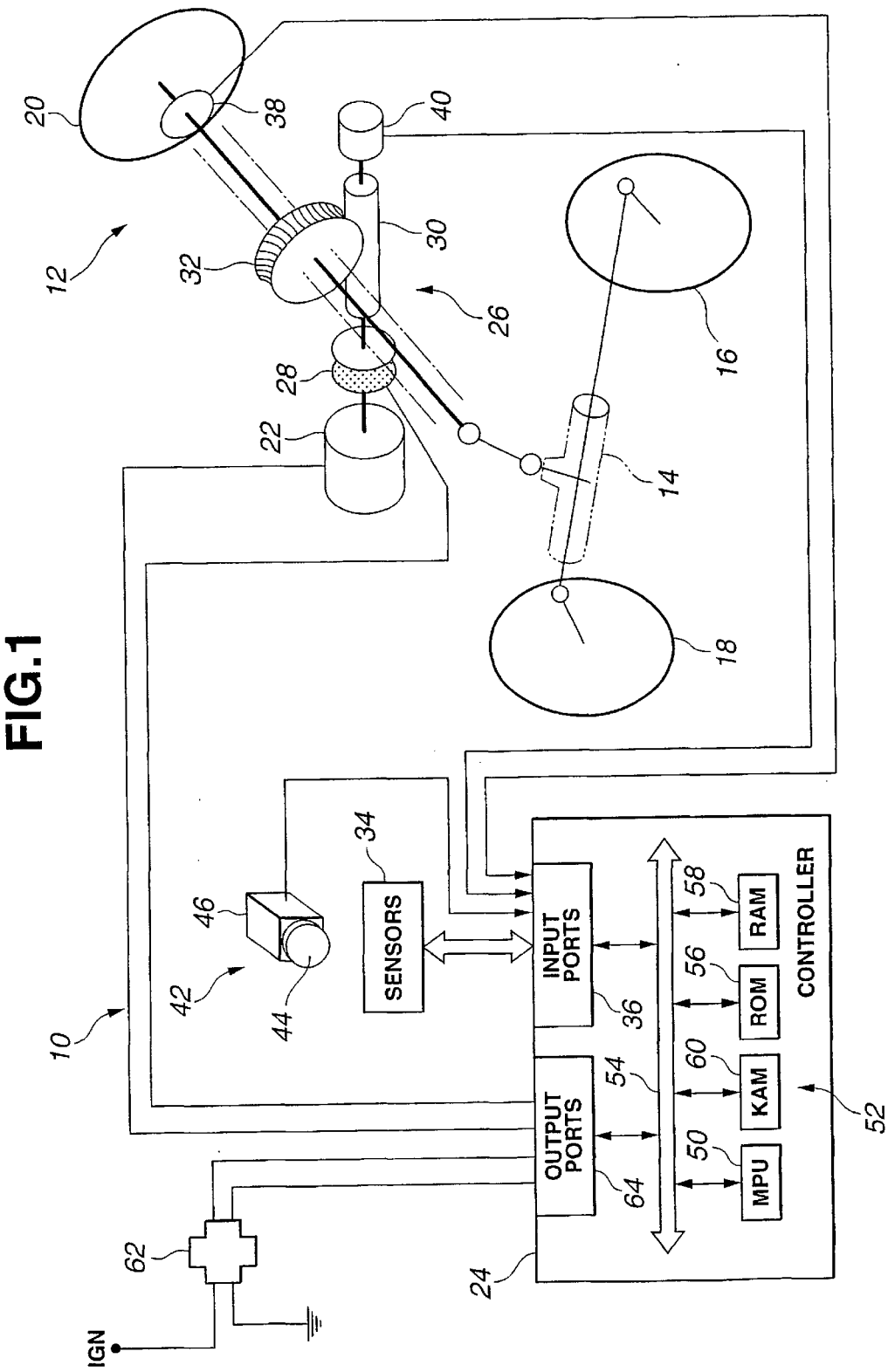
FIG. 1 is a block diagram of a LKS system implementing a lane-keeping control according to the present invention.

Referring now to FIG. 1, there is shown a LKS system for reducing driver workload in following or tracking a contrived centerline, which may be called a target line. The LKS system, generally indicated by reference numeral 10, is adapted for use with a conventional steering system 12 of a wheeled motor vehicle. As illustrated, the steering system 12 comprises a hydraulic power-assist steering (P/S) unit 14 for controlling the steered position of front wheels 16 and 18 of vehicle in response to manual operation of a steering wheel 20. The contrived centerline may be a true centerline between lane markings on a roadway or may be offset from the true centerline to facilitate the negotiation of curves.

In order to assist a driver in tracking the contrived centerline, a steering bias is applied to the steering system 12 in LKC mode. The steering bias is a torque input, which may either assist or oppose steering torque from the driver. Torque applied as the steering bias is herein referred to as "steering torque is assist $T_{assist}$," while torque applied from the driver is herein referred to as "driver torque $T_d$." Steering torque assist $T_{assist}$ is applied to steering system 12 by an actuator in the form of an electric motor 22. Electric motor 22 is coupled to the steering mechanism through a gearbox 26 and an electromagnetic clutch 28, which may be omitted from certain installations. The provision of clutch 28, however, is advantageous in disengaging electric motor 22 from steering system 12 immediately after a need arises to terminate lane-keeping control. Gearbox 26 includes a worm 30 and a wheel 32, in this example.

LKC system 10 may include various sensors 34 for generating signals indicative of vehicle velocity and vehicle lateral acceleration G. Such sensors 34 are in electrical communication with an electronic controller 24 via input ports 36.

Further, a steering wheel angle sensor 38 and an angle sensor 40 are in electrical communication with controller 24 via input ports 36. Steering wheel angle sensor 38 generates a signal indicative of an angular position of steering wheel 20. Angle sensor 40 generates a signal indicative of an angular position of worm 30 of gearbox 26.

In order to detect lane markings on a roadway, the vehicle is provided with a lane recognition unit 42. Lane recognition unit 42 includes a camera 44, which is mounted on the vehicle, for example, in the middle of the bonnet or grille, or in the vicinity of the internal rear-view mirror in order to detect the presence of lane markings on a roadway, for example the spaced white or yellow lines defining a lane. Camera 44 may be "light-sensitive" or the "infrared" sensing type. In a preferred embodiment, camera 44 is a charge-coupled-device (CCD) camera. Lane recognition unit 42 also includes a signal image processor 46. Signals from image processor 46 are fed to controller 24 via input ports 36.

Controller 24 preferably includes a microprocessor 50 in communication with various computer readable storage media 52 via data and control bus 54. Computer readable storage media 52 may include any one of a number of known devices, which function as a read-only memory (ROM) 56, random access memory (RAM) 58, keep-alive memory (KAM) 60, and the like. The computer readable storage media may be implemented by any one of a number of known devices capable of storing data representing instructions executable via a computer such as controller 24. Known devices may include, but are not limited to, PROM, EPROM, EEPROM, flash memory, and the like in addition to magnetic, optical, and combination media capable of temporary or permanent data storage.

Computer readable storage media 52 include various program instructions, software, and control logic to control motor 22 and clutch 28. Controller 24 receives signals from sensors 34, 38, 40, and image processor 46 via input ports 36 and generates output signals, which may be applied to a driver (shown in FIG. 2 at 86), including a motor relay 62, for actuator 22 and a driver (not shown) for clutch 28, via output ports 64.

Figure 2:
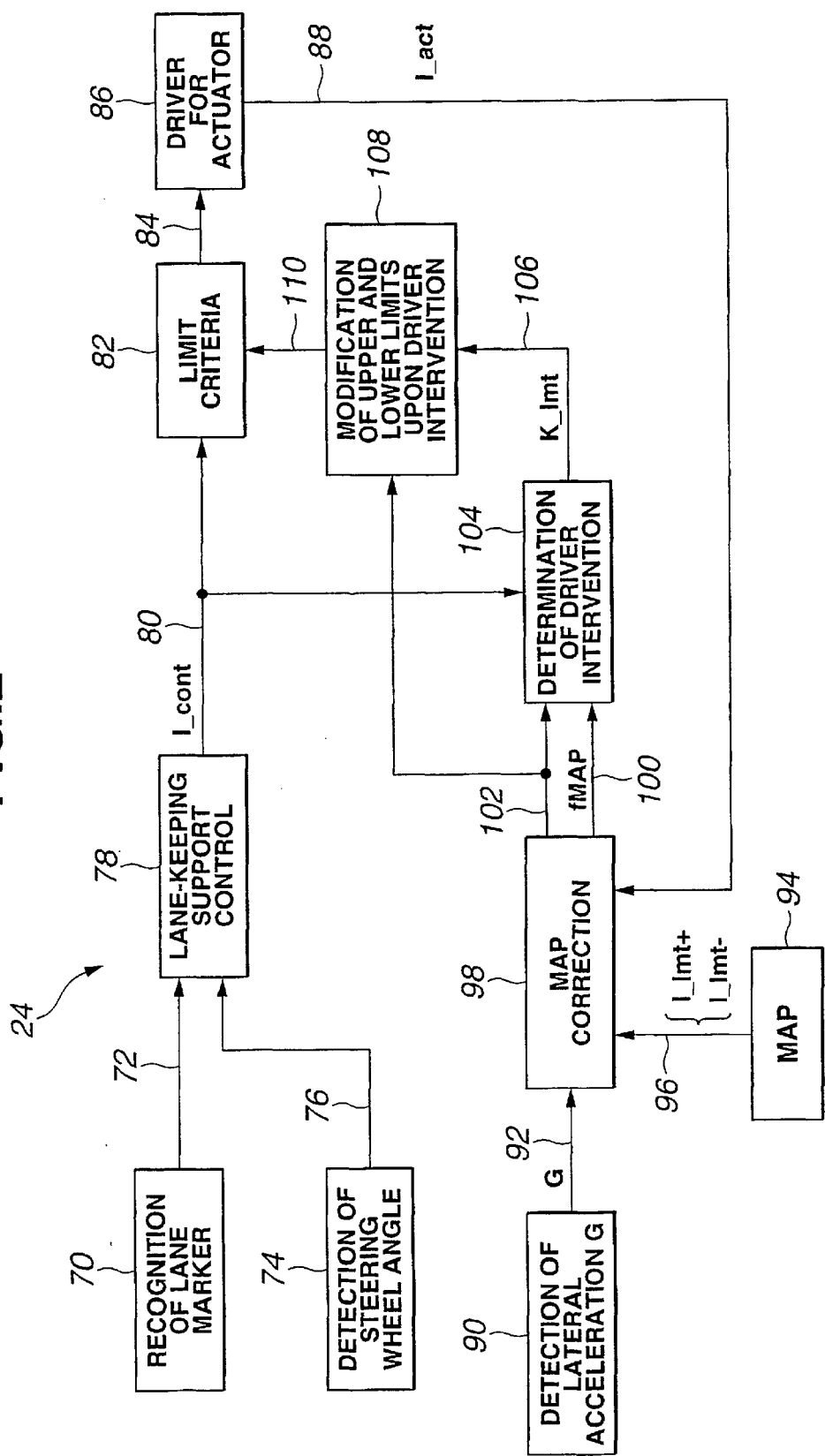
FIG. 2 is a functional block diagram of the lane-keeping control according to the present invention.

Referring now to FIG. 2, a functional block diagram of a lane-keeping control according to the present invention is shown. At block 70, lane markings on a roadway are recognized in response to signals from image processor 46, and lane marking information as to the recognized lane markings is generated at an output line 72. At block 74, steering wheel angle is detected from the output of steering wheel angle sensor 38, and steering wheel angle information as to the detected steering wheel angle is generated at an output line 76. Lane marking information on line 72 and steering wheel angle information on line 76 are applied to a lane-keeping support (LKS) control 78. Also applied to LKS control 78 is vehicle velocity. LKS control 78 uses such information to determine the road curvature of lane, a target line in the form of the contrived centerline between lane markings, and the lateral position of the vehicle in relation to lane markings. The lateral position of the vehicle may be represented by a lateral displacement from lane markings on one edge of a lane or a lateral displacement from the target line position. In the preferred embodiment, the lateral displacement from the target line is used to represent the lateral position of the vehicle in relation to lane markings. LKS control 78 uses the lateral position of the vehicle to determine an actuator drive current command I_cont so that the vehicle stays on the target line between lane markings. Actuator drive current command I_cont, which includes the direction and magnitude of applied current to motor 22, is generated at an output line 80.

The command I_cont on line 80 is fed to limit criteria 82. At limit criteria 82, the magnitude of current command I_cont is restrained between upper and lower limits. The current command having past limit criteria 82 is applied via an output line 84 to a driver for actuator 86. Driver 86 controls actuator drive current I_act applied to motor 22 in accordance with the current command, thus controlling steering torque assist $T_{assist}$. Information as to actuator drive current I_act is available on an output line 88 of driver 86. For further understanding of LKS control 78, reference is made to Shimakage et. al., "Design of Lane-Keeping Control with Steering Torque Input for a Lane-Keeping Support System" SAE Technical Paper Series 2001-01-0480, Steering and Suspension Technology Symposium 2001 (SP-1597), Detroit, Mich. Mar. 5–8, 2001, which is hereby incorporated by reference in its entirety.

As will be appreciated from the preceding description, current command I_cont generated by LKS control 78 corresponds to steering torque assist $T_{assist}$, which is required to assist a driver in steering a vehicle to keep a target line between lane markings. In order to keep the target line between lane markings during driving the vehicle in LKC mode, LKS control 78 has three compensators. They are a feedforward compensator for offsetting a delay in steering the vehicle wheels to follow the road curvature of lane, a feedback compensator for offsetting undesired effect in appropriately holding the vehicle lateral position in relation to lane markings and the vehicle yaw angle relative to the target line, and a disturbance compensator for offsetting undesired effect due to disturbance. Such disturbance is derived from road surface irregularities including cants and/or nuts, cross wind, and steering intervention by the vehicle driver.

Figure 4:
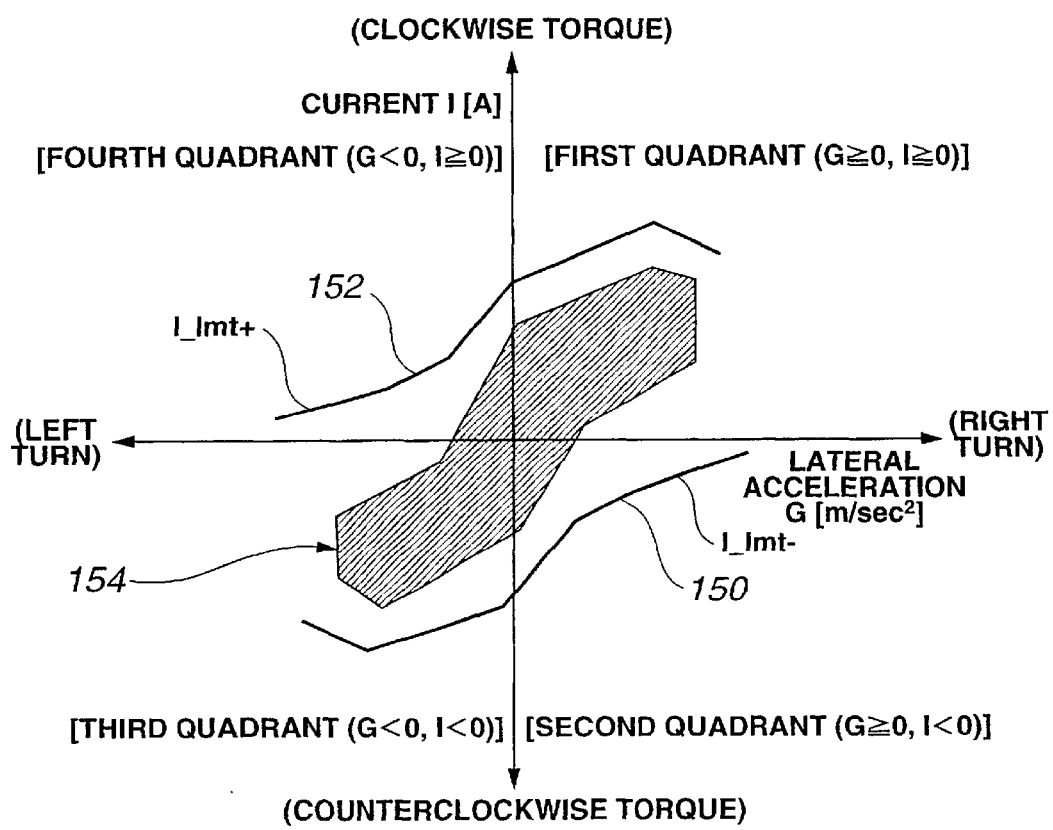
FIG. 4 is a two-dimensional coordinate system, showing a map having two sets of limit data between which a range of values of current command during steering a vehicle to turn in lane-keeping control (LKC) mode under the absence of continuous disturbance.

With continuing reference to FIG. 2, at block 90, lateral acceleration G at the vehicle's center of gravity is detected and information as to the detected lateral deceleration G is generated at an output line 92. At a block 94, a set of upper limit data of current command indexed by lateral acceleration and a set of lower limit data of current command indexed by lateral acceleration are stored in a map. Retrieving the upper and lower limit data with the lateral deceleration gives an upper limit value I_lmt+, and a lower limit value I_lmt− at an output line 96. Referring to FIG. 4, the fully drawn line 150 illustrates the set of lower limit data, and the fully drawn line 152 illustrates the set of upper limit data.

With continuing reference to FIG. 4, upper and lower limit values I_lmt+ and I_lmt− on the contour lines 152 and 150, respectively, will be described. In the two-dimensional coordinate system, the x-axis represents lateral acceleration, and the y-axis represents current. Letting I_lmt denote generally the upper and lower limit values I_lmt+ and I_lmt−, then, the following equation holds:

$$I\_lmt = I\_sat - I\_ps + I\_dis \qquad (1),$$

where:
  I_sat represents self aligning torque expressed in terms of electric current;
  I_ps represents power steering assist torque expressed in terms of electric current; and
  I_dis represents extra torque expressed in terms of electric current, which extra torque being determined taking into account disturbance induced by, for example, friction loss.

In the equation (1), the term (I_sat−I_ps) represents the minimum actuator drive current required for cornering. It exhibits non-linear characteristic against steering wheel angle near the neutral position of the steering wheel because I_ps exhibits non-linear characteristic. This non-linear characteristic of the term (I_sat−I_ps) is reflected in the contour of each of lines 150 and 152. The contour and position of each of lines 150 and 152 is determined taking into account the contour and position of closed loop surrounding the shadowed area, which is generally indicated by the reference numeral 154. The shadowed area 154 covers a standard pattern of variation of steering torque assist expressed in terms of actuator driver current with different lateral acceleration during driving of vehicle in LKC mode when there is no continuous disturbance. In other words, this shadowed area 154 covers all possibility of actuator drive current applied to motor 22 during driving of the vehicle in LKC mode when there is no continuous disturbance.

As mentioned above, the contour and position of each of lines 150 and 152 is determined taking into account the shadowed area 154. The relationship between the shadowed area 154 and each of contour lines 150 and 152 will be further described in connection with FIG. 4. The illustrated coordinate system has four quadrants, namely, the first quadrant where $G \geq 0$ and current $I \geq 0$, the second quadrant where $G \geq 0$ and I<0, the third quadrant where G<0 and I<0, and the fourth quadrant where G<0 and I>0 (G: lateral acceleration, I: current). Within the first guardant, the contour line 152 is spaced along the y-axis generally equidistant from the periphery of the shadowed area 154. Similarly, within third quadrant, the contour line 150 is spaced along the y-axis generally equidistant from the outer periphery of the shadowed area 154. Within the second quadrant, there is sufficient margin from the line 150 to the outer periphery of the shadowed area 154. In the same manner, within the fourth quadrant, there is sufficient margin from the line 152 to the outer periphery of the shadowed area 154. Design of the illustrated spaced relationship is intended to allow driver steering intervention without departure from LKC mode over the overall range of lateral acceleration G as long as driver torque for such steering intervention is less than a predetermined level This predetermined level is held generally unaltered over the overall range of lateral acceleration. As mentioned before in connection with FIG. 2, LKS control 78 has disturbance compensator. To offset undesired effect due to disturbance in LKC mode, the disturbance compensator increases a disturbance-compensating current component of actuator driver current command I_cont in response to driver torque for steering intervention. If the actuator drive current I_cont exceeds the upper or lower limit value on the contour line 152 or 150 due to excessive increase of disturbance-compensating current component, a reduction in actuator drive current I_act, which is being applied to motor 22 (see FIG. 1) to produce steering torque assist $T_{assist}$, will be made to readily allow driver steering intervention on the recognition that there is an intention of driver to intervene steering action.

In the embodiment, computer readable storage media 52 has stored thereon a map in which upper and lower limit values I_lmt+ and I_lmt− are allocated as indexed by lateral acceleration G to exhibit non-linear current versus lateral acceleration characteristics as shown by the contour lines 152 and 150 in FIG. 4. The illustrated non-linear characteristics allow driver steering intervention without departure from LKC mode over the overall range of lateral acceleration G as long as driver torque for such steering intervention is less than the predetermined level, which is unaltered over the overall range of lateral acceleration.

Figure 5:
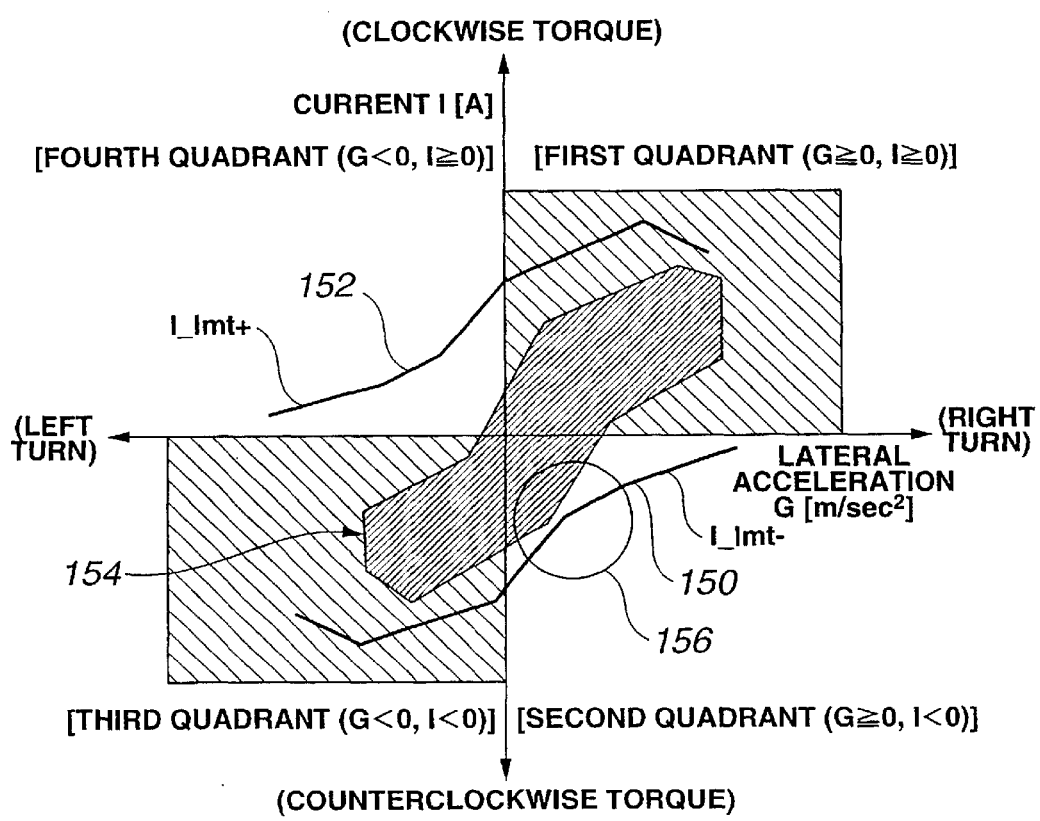
FIG. 5 is a two-dimensional coordinate system, showing the map shown in FIG. 5 including the two sets of limit data between which a range of values of current command during steering the vehicle to turn in the LKC mode under the presence of continuous disturbance.

The upper and lower limit values I_lmt+ and I_lmt− provided by the map might work as intended if continuous disturbance were completely removed over the whole span of operating life of the vehicle. Such continuous disturbance, however, is unavoidable and derivable from various kinds of cause. One such example is incomplete alignment of vehicle suspension system. Another example is imbalance in friction between right and left turning motions in vehicle steering system. The disturbance compensator of LKS control 78 responds also to such continuous disturbance to provide imbalanced distribution of actuator drive current I_cont between left and right turning motions in the steering system, causing a continuous deviation (or offset) from the original position of the shadowed area 154 as illustrated in FIG. 4 to the deviated position thereof, as illustrated, for example, in FIG. 5. FIG. 5 illustrates the deviated shadowed area 154 resulting from continuous disturbance during left turning motion in the steering system. The deviated shadowed area 154 in FIG. 5 is given after a rightward displacement along x-axis from the original position of the shadowed area 154 as illustrated in FIG. 4. The presence of continuous disturbance during right turning motion in the steering system provides a continuous deviation from the original position of the shadowed area 154 as illustrated in FIG. 4 through a leftward displacement along x-axis.

As illustrated in FIG. 5, the presence of continuous disturbance during left turning motion in the steering system causes the margin between contour line 150 and the periphery of the rightwards-deviated shadowed area 154 to unacceptably narrow within the second quadrant at a portion enclosed by a circle 156. The presence of continuous disturbance during right turning motion in the steering system causes the margin between the contour line 152 and the periphery of the leftwards-deviated shadowed area, not shown, to unacceptably narrow within the fourth quadrant at a certain portion. This clearly teaches that use of the second and fourth quadrant be avoided in recognizing driver intention to intervene steering action during driving in LKC mode.

Figure 6:
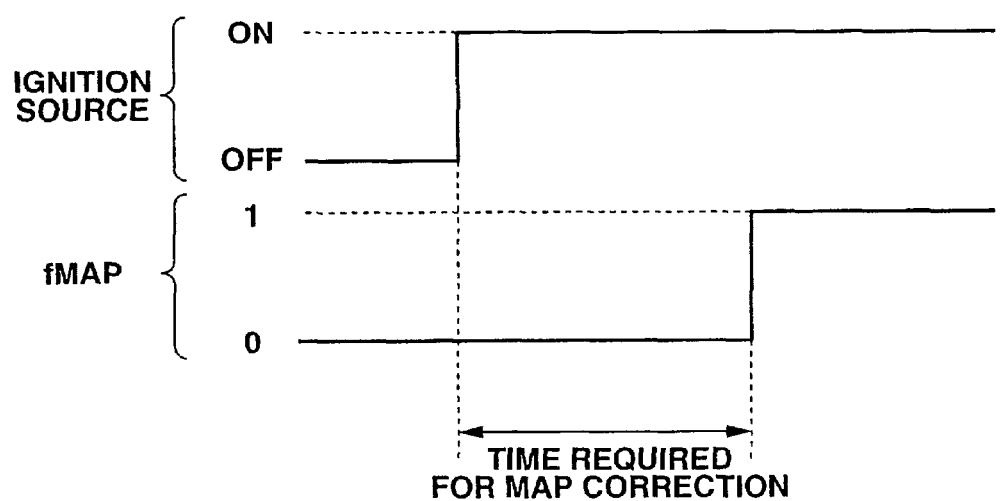
FIG. 6 is a timing chart of a two-level map-correction completion flag.

In order to avoid the undesired effect due to the presence of such continuous disturbance in recognizing driver intention to intervene steering action, the data in the map is corrected according to the present invention. Turning back to FIG. 2, at block 98, the data in the map is corrected after sampling a predetermined number of data during driving in LCK mode. Sampling the predetermined number of data requires considerably long time. With reference to the timing diagram of FIG. 6, in the embodiment, the map correction begins with turning on the engine ignition source and ends with setting of a map-correction completion flag fMAP (a change in level from "0" to "1"). The time required for such map correction is variable depending mainly upon how long it may take to sample the predetermined number of variable data for the map correction. The manner of correcting the map will briefly described although the precise description thereof will be made later in connection with FIGS. 13 to 15. Briefly describing, immediately after the ignition source has been turned on, monitoring actuator drive current I_act actually applied to motor 22 and lateral deceleration G starts at block 98. The monitored values of lateral acceleration G are indexed by the monitored values of current I_act, respectively, during driving in LKC mode. The magnitude of each of the monitored current values I_act is compared to a predetermined value α, and if it is less than the predetermined value, the accompanying lateral acceleration value is used as a sample. A predetermined number NO of such samples are collected. Then, among the samples collected, the maximum $G_{max}$ and the minimum $G_{min}$ are chosen for calculation of a parameter $G_{ave}$ indicative of the deviation, which has been described in relation to the undesired effect caused by the presence of continuous disturbance. In this embodiment, the deviation indicative parameter $G_{ave}$ is expressed as:

$$G_{ave}=(G_{min}+G_{max})/2 \qquad (2).$$

Figure 14:
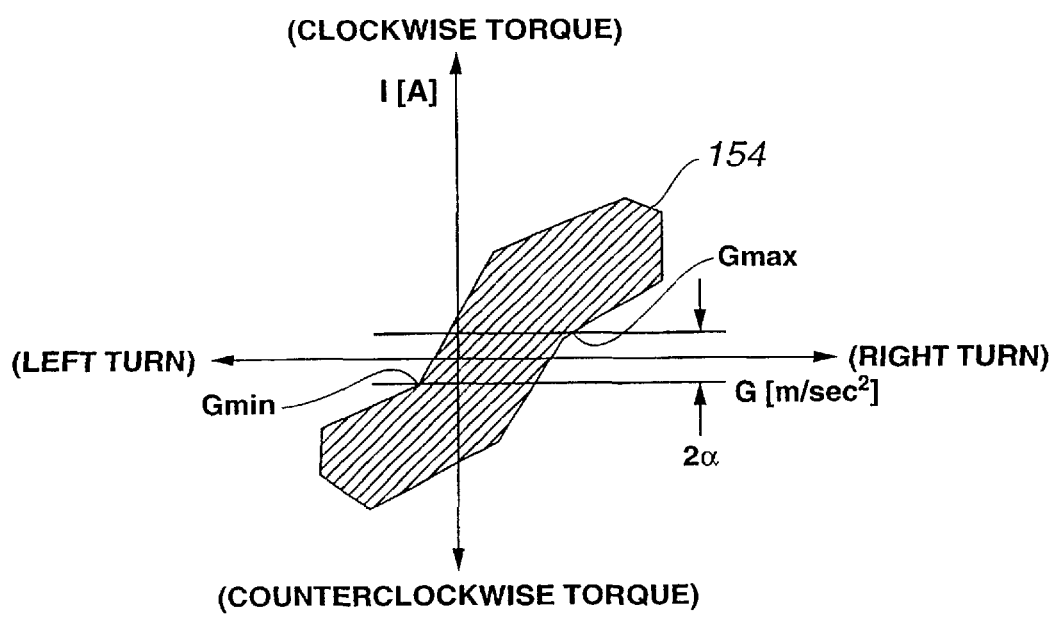
FIG. 14 is a two-dimensional coordinate system, showing a range that is used to sample data.
Figure 15:
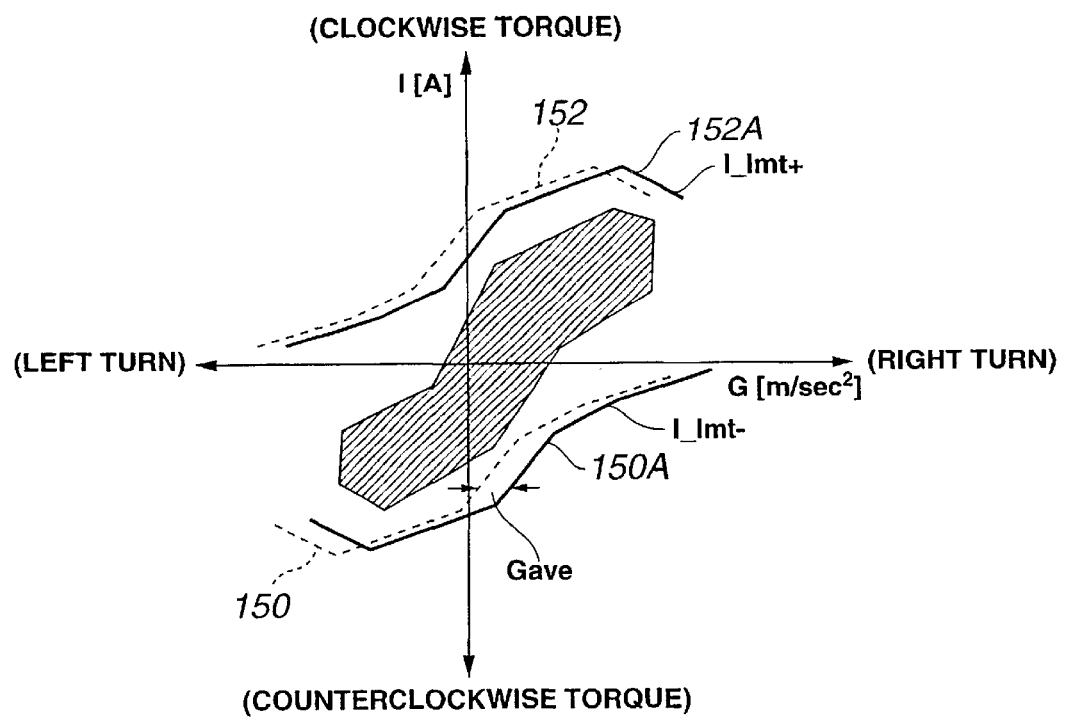
FIG. 15 is a similar view to FIG. 5, showing one example of corrected sets of limit data made by the map correction illustrated in FIGS. 13 and 14.

The predetermined value α is chosen in consideration of the contour of the periphery of the deviated shadowed area 154 as illustrated in FIG. 14. The shadowed area illustrated in FIG. 14 is the same as that illustrated in FIG. 5. In FIG. 14, the predetermined value α is a half of a distance 2α along the y-axis between the one nearest, from the x-axis, point of inflection on the periphery of the deviated shadowed area 154 which is disposed within the first quadrant and the another nearest point of inflection on the periphery of the deviated shadowed area 154 which is disposed within the third quadrant Using the parameter $G_{ave}$, the map is corrected as illustrated in FIG. 15. As illustrated in FIG. 15, the upper limit data as illustrated by the contour dotted line 152 and the lower limit data as illustrated by the contour dotted line 150 are shifted along the x-axis by an amount indicated by parameter $G_{ave}$ to the corrected position as indicated by the fully drawn contour lines 152A and 150A, respectively.

Upon completion of such map correction, map-correction completion flag fMAP is set.

With reference again to FIG. 2, the above-mentioned map correction and control of the map-correction completion flag fMAP are carried out at block 98. The state of flag fMAP is always generated at one output line 100. After completion of map correction, the corrected upper and lower limit values I_lmt+* and I_lmt−* are found by retrieving the corrected data as indicated by the contour lines 152A and 150A in FIG. 15 using the detected values of lateral acceleration G. The corrected upper and lower limit values I_lmt+* and I_lmt−* are generated at the other output line 102. The corrected upper and lower limit values I_lmt+* and I_lmt−* are fed, unmodified, to limit criteria 82 for limiting actuator drive current command I_cont that is generated by LKS control 78 unless driver intention for steering intervention is determined at block 104. The corrected upper and lower limit values I_lmt+* and I_lmt−* are fed to block 104 and used for determining whether or not there is driver steering intervention. At block 104, the occurrence of driver steering intervention is determined if the available one of the corrected upper and lower limit values I_lmt+* and I_lmt−* is exceeded by actuator drive current I_cont.

The upper and lower limit values I_lmt+ and I_lmt− generated during the map correction are described. As discussed before in connection with FIG. 5, the lower limit data within the second quadrant and the upper limit data with the third quadrant are not appropriate enough for use in determining the occurrence of driver steering intervention under the presence of continuous disturbance. In the embodiment, such data within the second and fourth quadrant are not used in determining whether or not there is driver intention to intervene steering action during driving in LKC mode. However, the upper limit data within the first quadrant as indicated by the shadowed rectangle in FIG. 5 and the lower limit data within the third quadrant as indicated by the shadowed rectangle in FIG. 5 are used in determining whether or not there is driver steering intervention at block 104. In other words, such data are used in determining upper or lower limit value I_lmt+ or I_lmt− against the detected value of lateral acceleration G and fed to block 104. This restricted use of the map data may be easily done by finding the upper limit value I_lmt+ against the detected value of lateral acceleration G from the data indicated by the contour line 152 only when G≧0, and finding the lower limit value I_lmt− against the detected value of lateral acceleration G from the data indicated by the contour line 150 only when G<0.

Thus, until the map correction will be completed, such limit values I_lmt+ and I_lmt− are fed to block 104 and used for determining whether or not there is driver steering intervention. The manner of determining whether or not there is driver steering intervention will be later described in detail in connection with FIGS. 2 and 3. During the map-correction, all of the uncorrected map data are used to find upper and lower limit values I_lmt+ and I_lmt− against the detected values of lateral acceleration G and used at block 82 for limiting actuator drive current command I_cont during driving in LKC mode.

Figure 7:
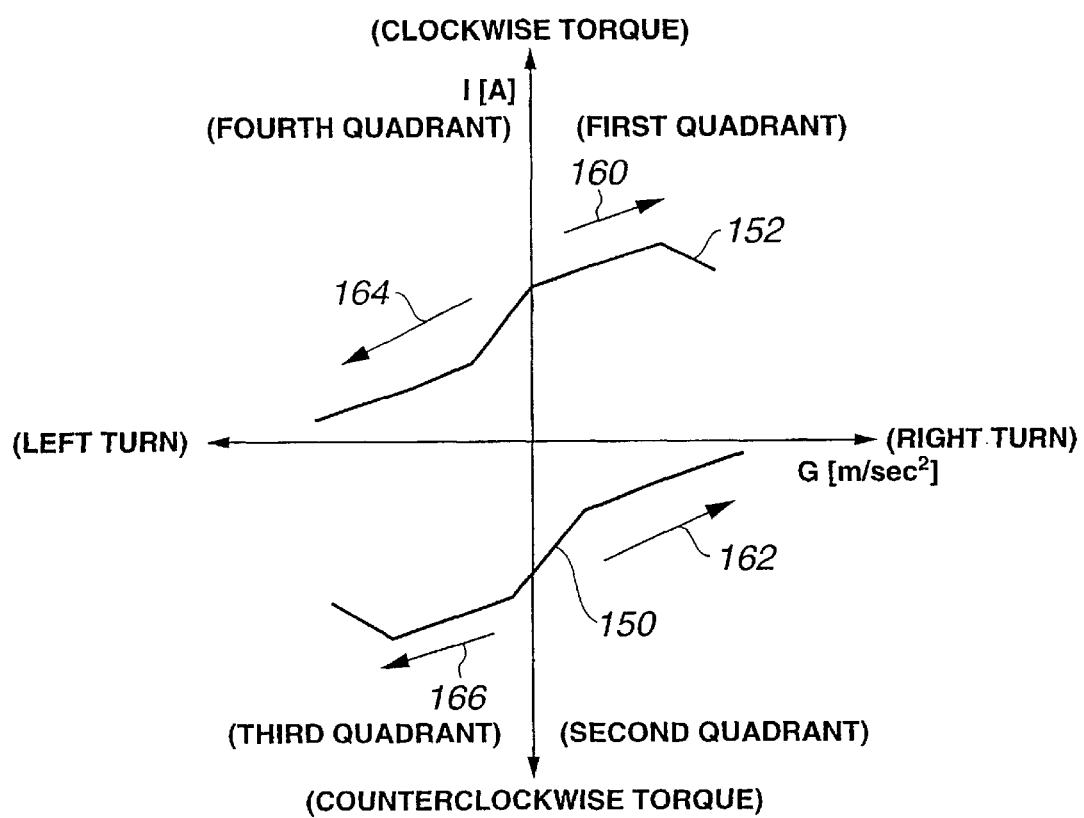
FIG. 7 is a two-dimensional coordinate system, showing the sets of limit data shown in FIGS. 4 and 5.

Prior to further progress of discussion, referring to FIG. 7, the contour of each of limit data lines 152 and 150 are described in relation to steering motion in following the target line between lane markings during driving in LKC mode. Referring to FIG. 7, a portion of the upper limit data line 152 that is disposed within the first quadrant is used when clockwise torque is applied to the steering system 12 by motor 22 to increase the steered angle from the neutral position during driving in LKC mode. During this steering action in entering right turn motion of the vehicle, the magnitude of (leftward) lateral acceleration G is varied with differing traveling speed of the vehicle and yaw rate. Subsequently, counterclockwise torque is applied to return the steering system 12 toward the neutral position in a manner to decrease the steered angle. Under this return steering action, a portion of the lower limit data line 150 that is disposed within the second quadrant is used.

Next, steering action to enter left turn motion in tracking the target line in LKC mode is considered. The other portion of the lower limit data line 150 that is disposed within the third quadrant is used when counterclockwise torque is applied to the steering system 12 by motor 22 to increase the steered angle from the neutral position. During this steering action in entering left turn motion of the vehicle, the magnitude of (rightward) lateral acceleration G is varied with differing traveling speed of the vehicle and yaw rate. Subsequently, clockwise torque is applied to return the steering system 12 toward the neutral position in a manner to decrease the steered angle. Under this return steering action, the other portion of the upper limit data line 152 that is disposed within the fourth quadrant is used.

With regard to the contour of the one portion of line 152 that is disposed within the first quadrant, the magnitude of upper limit value I_lmt+ varies linearly with different magnitudes of lateral acceleration G over the range from 0 to a first predetermined value, on the x-axis, below a point of inflection on the line 152 such that it increases as the magnitude of lateral acceleration G increases as indicated by an arrow 160. Beyond this range, the magnitude of upper limit value I_lmt+ decreases as the magnitude of lateral acceleration G increases further beyond the first predetermined value. With regard to the contour of the one portion of line 150 that is disposed within the second quadrant, this portion of line 150 consists of two different sections interconnected to make a point of inflection that is distant along the y-axis from a second predetermined value on the x-axis. This second predetermined value is spaced from 0 less than the first predetermined value is. The magnitude of lower limit value I_lmt- varies linearly with different magnitudes of lateral acceleration G over the range from 0 to the second predetermined value on the x-axis such that it decreases as the magnitude of lateral acceleration G increases. Beyond this range, the magnitude of lower limit value I_lmt- decreases and approaches toward zero as the magnitude of lateral acceleration G increases further beyond the second predetermined value as indicated by an arrow 162.

With regard to the contour of the other portion of line 150 that is disposed within the third quadrant, the magnitude of lower limit value I_lmt- varies linearly with different magnitudes of lateral acceleration G over the range from 0 to a third predetermined value, on the x-axis, below a point of inflection on the line 150 such that the magnitude of the lower limit value I_lmt- increases as the magnitude of lateral acceleration G increases as indicated by an arrow 166. Beyond this range, the magnitude of lower limit value I_lmt- decreases as the magnitude of lateral acceleration G increases further beyond the third predetermined value. With regard to the contour of the other portion of line 152 that is disposed within the fourth quadrant, this portion of line 152 consists of two different sections interconnected to make a point of inflection that is distant along the y-axis from a fourth predetermined value on the x-axis. This fourth predetermined value is spaced from 0 less than the third predetermined value is. The magnitude of upper limit value I_lmt+ varies linearly with different magnitudes of lateral acceleration G over the range from 0 to the fourth predetermined value on the x-axis such that it decreases as the magnitude of lateral acceleration G increases. Beyond this range, the magnitude of upper limit value I_lmt+ decreases and approaches toward zero as the magnitude of lateral acceleration G increases further beyond the fourth predetermined value as indicated by an arrow 164.

As is readily seen from FIG. 7, the original map is designed to hold the symmetry in ease of driver steering intervention between steering action for right turn motion and steering action for left turn motion. Accordingly, the first predetermined value on the x-axis is spaced from 0 as much as the third predetermined value on the x-axis is, and the second predetermined value on the x-axis is spaced from 0 as much as the fourth predetermined value on the x-axis is.

Referring back to FIG. 2, at block 104, driver steering intervention is determined by comparing actuator driver current command I_cont to the limit value generated at output line 102. During the map-correction, such determining of driver steering intervention is not carried upon return steering action during driving in LKC mode, although it is carried out during steering action in entering turn motion of the vehicle. The limit value generated at output line 102 differs depending upon the state of map-correction completion flag fMAP. During the map correction when flag fMAP is at 0 level, the upper limit data within the first quadrant (see FIG. 5) are used to determine an upper limit value I_lmt+ against lateral acceleration G, or the lower limit data with the third quadrant are used to determine a lower limit value I_lmt- against lateral acceleration G. Such upper or lower limit value is fed to block 104 for determination of driver steering intervention. During the map-correction, no such limit value is fed to block 104 for determination of driver steering intervention because the map data within the second or fourth quadrant (see FIG. 5) are not used. Accordingly, during the map correction, determining of driver steering intervention is not carried out during return steering action.

Upon or immediately after the completion of map correction when flag fMAP has shifted from 0 level to 1 level, determining driver steering intervention is carried out, at block 104, over the whole phases of steering action during driving in LKC mode. The corrected upper and lower limit values I_lmt+* and I_lmt-*, which have been determined against lateral acceleration, are fed to block 104 for determination of driver steering intervention.

At block 104, it is determined whether or not I_cont>I_lmt+* (or I_lmt+) to carry out time dependent decrement of a current-limiting coefficient K_lmt from 1 if I_cont>I_lmt+* (or I_lmt+). If I_cont≦I_lmt+* (or I_lmt+), it is determined whether or not I_cont≦I_lmt-* (or I_lmt-). If this is the case, the decrement of current-limiting coefficient K_lmt is carried out. Coefficient K_lmt is generated at an output line 106 and fed to block 108. At block 108, the upper and lower limits used in limit criteria 82 are modified upon occurrence of driver steering intervention.

For processing at block 108, during the map-correction, the original or uncorrected map data are used to determine upper and lower limit values I_lmt+ and I_lmt- against lateral deceleration over the whole phases of steering action during driving in LKC mode. Such limit values are fed to block 108. Upon or after completion of the map-correction, corrected upper and lower limit values I_lmt+* and I_lmt-*, which have been determined against lateral deceleration, are fed to block 108. Using such limit value data and coefficient K_lmt, the following equations are calculated and the calculation results are supplied to limit criteria 82 as upper and lower limits.

$$I\_lmt+ (\text{or } I\_lmt+^*) = I\_lmt+ (\text{or } I\_lmt+^*) \times K\_lmt \quad (3),$$

$$I\_lmt- (\text{or } I\_lmt-^*) = I\_lmt- (\text{or } I\_lmt-^*) \times K\_lmt \quad (4).$$

As K_lmt is equal to 1 when there is no driver steering intervention during driving in LKC mode, I_lmt+ (or I_lmt+*) and I_lmt- (or I_lmt-*) as unmodified are set as the upper and lower limits of limit criteria 82. At limit criteria 82, the instantaneous absolute value of actuator driver current command I_cont is equal to the absolute value of actuator drive current I_act for a range of values lying between the upper and lower limits, but, for input values above the range, the absolute value of actuator drive current I_act is approximately at a level corresponding to the upper or lower limit. Thus, the function of limit criteria 82 is analogous to the function of a clipper-limiter As mentioned before, coefficient K_lmt takes gradually decreasing values less than 1 upon and after determination of driver steering intervention, causing the range between the upper and lower limits at limit criteria 82 to be become narrow considerably. Accordingly, the absolute value of actuator drive current I_act and the magnitude of steering torque assist $T_{assist}$ reduce considerably to allow driver steering intervention and smooth shift from driving in LKC mode to driving in NDC (normal driver control) mode.

With reference also to FIGS. 5 and 7, during the map-correction, determination of driver steering intervention is not carried out, at block 104, during the return phase of steering action in LKC mode. In this case, the above-mentioned reduction in the magnitude of steering torque assist $T_{assist}$ is not expected upon occurrence of driver steering intervention. However, the magnitude of steering torque assist $T_{assist}$ decreases toward zero as the magnitude of lateral acceleration increases due to driver steering intervention during the return phase of steering action in LKC mode, thus allowing driver steering intervention. This may be confirmed by the contour line 150 within the second quadrant and the contour line 152 within the fourth quadrant. The magnitude of steering torque assist $T_{assist}$ allowed during return phase of steering action is considerably suppressed and approaches toward zero as the magnitude of lateral acceleration increases. Accordingly, the steering torque assist $T_{assist}$ control initiated by the determination of driver steering intervention may be omitted without any possibility of imparting objectionable feel to the driver.

In the preceding description, the control logic has been described. As will be appreciated by one ordinary skilled in the art, such control logic may be implemented in hardware, or a combination of hardware and software. The various functions are preferably carried out by a programmed microprocessor, but may include one or more functions implemented by dedicated electric, electronic, or integrated circuits. In the embodiment, the various functions are stored as data representing instructions stored in computer readable storage media 52 (see FIG. 1).

Figure 3:
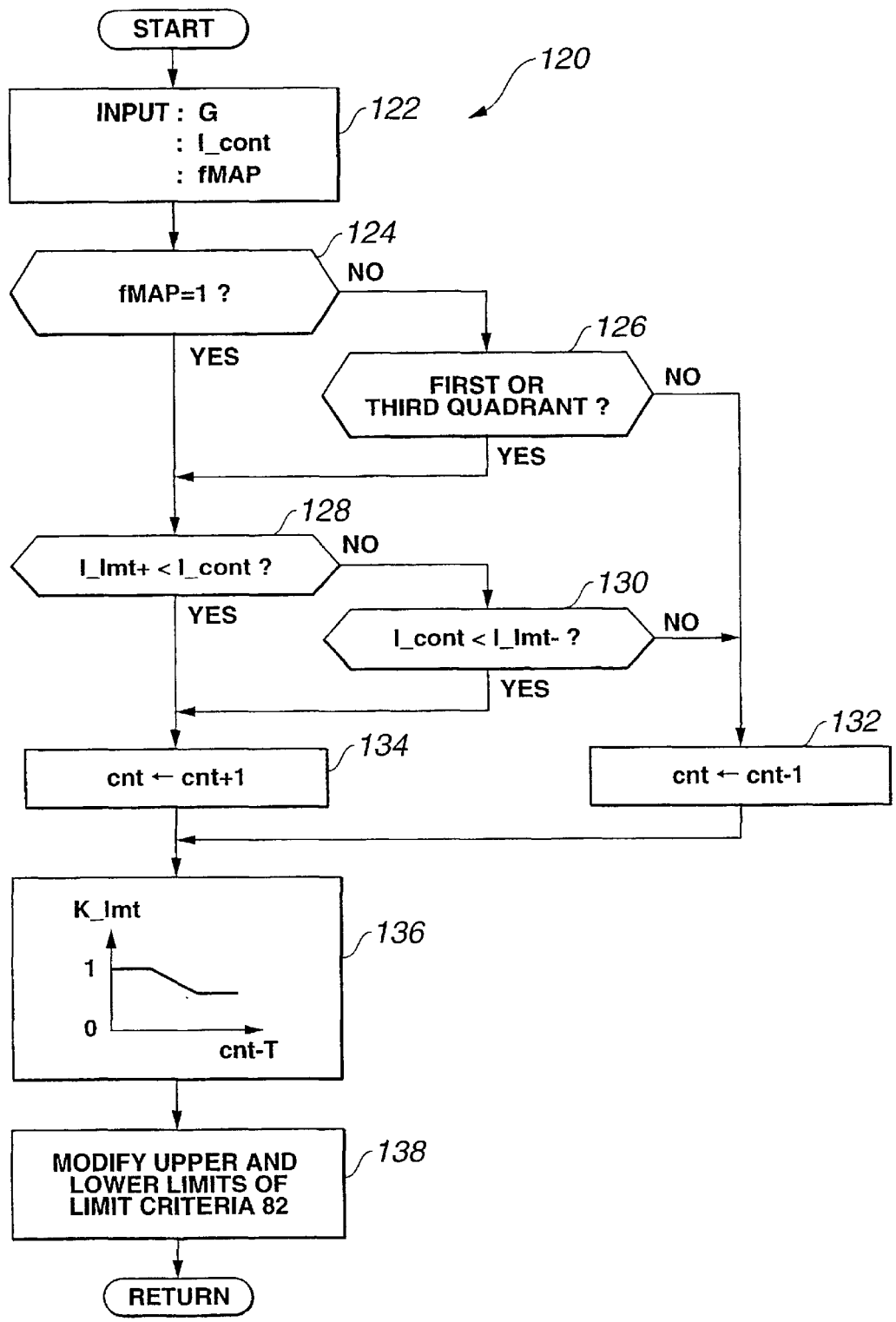
FIG. 3 is a block diagram illustrating one feature of the present invention.

Referring to FIG. 3, a control routine, for determination of driver steering intervention and modification of upper and lower limits of limit criteria, is indicated generally at 120.

In FIG. 3, at input block 122, the instantaneous values of lateral acceleration G, actuator driver current command I_cont, and map-correction completion map fMAP are received and stored. At block 124, it is determined whether flag fMAP is equal to 1 level. If, at block 124, fMAP is not equal to 1 (no), the process goes to block 126. If, at block 124, fMAP is equal to 1 (yes), the process goes to block 128.

As the map-correction is not yet completed, the instantaneous values of lateral acceleration G and actuator driver current command I_cont are compared to 0 (zero) to find which one of the four quadrants in the two-dimensional coordinate system shown in FIG. 5 may be used to retrieve limit data (contour lines 152 and 150). If, at block 126, it is determined that the first quadrant ($0 \leq G$ and $0 \leq I\_cont$) or the third quadrant ($G \leq 0$ and $I\_cont \leq 0$) may be used, the process goes to block 128. Under this condition, the limit data within the first or third quadrant is retrieved to find an upper or lower limit value I_lmt+ or I_lmt-. If, at block 126, it is determined the first and third quadrant may not be used, the process goes to block 132. Until completion of map-correction, the portions of uncorrected or original limit data that are disposed within the first and third quadrants are used to provide the upper or lower limit value I_lmt+ or I_lmt- for processing at block 128 and onwards.

If, at block 124, flag fMAP is equal to 1, it is indicated that the map-correction has been completed and the corrected limit data may be used to provide corrected upper and lower limit values I_lmt+* and I_lmt-*, which have been determined against the instantaneous value of lateral acceleration G, are used as upper and lower limit values I_lmt+ and I_lmt- for processing at block 128 and onwards.

At block 128, it is determined whether or not I_lmt+<I_cont. If this is the case, the process goes from block 128 to block 134. If this is not the case, the process goes from block 128 to block 130. At block 130, it is determined whether or not I_cont<I_lmt-. If this is the case, the process goes from block 130 to block 134. If this is not the case, the process goes from block 130 to 132. As will be appreciated by one ordinary skilled in the art, what are performed at blocks 128 and 130 is to determine the occurrence of driver steering intervention if the instantaneous value of actuator driver current command I_cont lies above a range of values lying between and including the two limit values I_lmt+ and I_lmt-.

If the driver steering intervention is determined in the above manner, the process goes to block 134 from block 128 or block 130. At block 134, increment of a counter cnt is performed (cnt←cnt+1).

If the instantaneous value of actuator driver current command I_cont falls in the range of values lying between and including the two limit values I_lmt+ and I_lmt-, the process goes from block 130 to block 132.

At block 132, decrement of counter cnt is performed (cnt←cnt-1).

The content of counter cnt is proportional to actual time elapsed from the beginning of driver steering intervention because the driver intervention elapse time cnt-T can be expressed as the product of cnt and sampling time T. After increment or decrement of the counter cnt at block 134 or 132, the process goes to block 136.

At block 136, the instantaneous value of current-limiting coefficient K_lmt is found against the instantaneous value of elapsed time cnt-T in the manner as shown by the illustrated graph. As illustrated, the value of coefficient K_lmt decreases from 1 as elapsed time cnt-T increases. Then, the process goes to block 138.

At block 138, the upper and lower limits of limit criteria 82 are modified using the equations as follows:

$$I\_lmt+ = I\_lmt+ \times K\_lmt \quad (5),$$

$$I\_lmt- = I\_lmt- \times K\_lmt \quad (6).$$

It will be appreciated by one ordinary skilled in the art that the various steps in the control routine 120 illustrate one preferred implementation of the functions previously described in connection with blocks 90, 94, 98, 104, and 108 shown in FIG. 2.

In the preceding description, it has been described in connection with FIG. 5 that, during the map-correction, the uncorrected limit data disposed in the first and third quadrants in the two-dimensional coordinate system are sufficiently reliable in determining driver steering intervention because the data portion enclosed by the circle 156 is removed. Utilizing only reliable portions of the uncorrected limit data by avoiding the portion of the data within the circle 156 may be made in various different manners. One example is to use so-called modified first and third quadrants as illustrated in FIG. 9 or 10.

Figure 9:
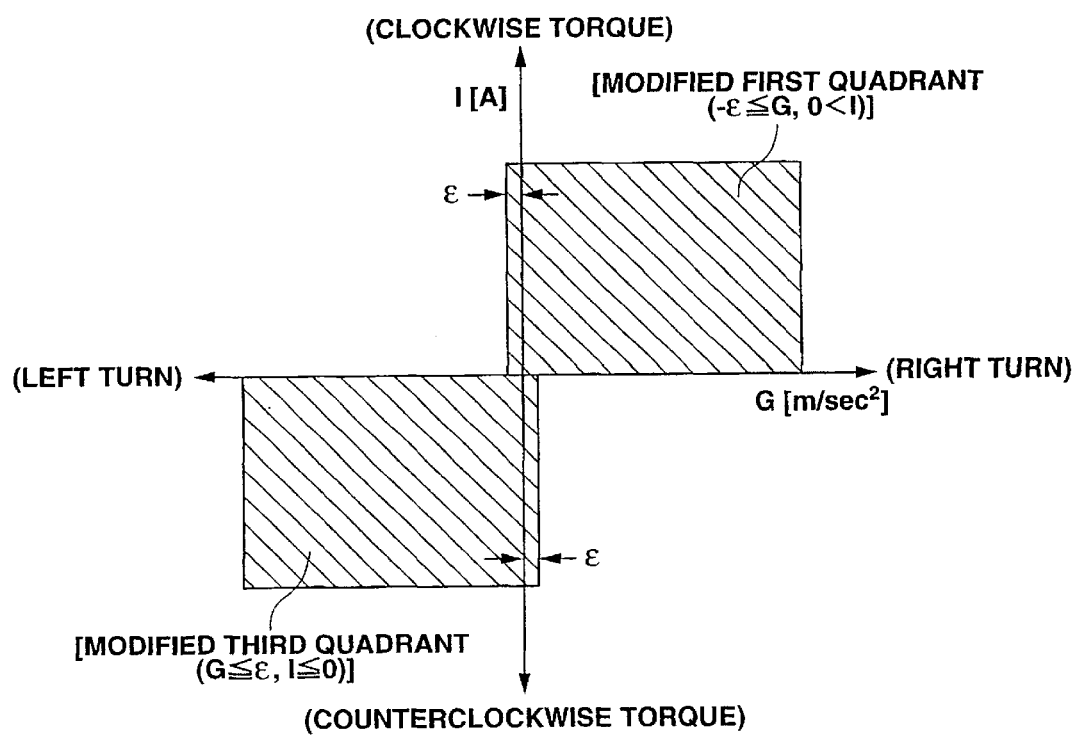
FIG. 9 is a two-dimensional coordinate system showing one example of modified first and third quadrants.
Figure 11:
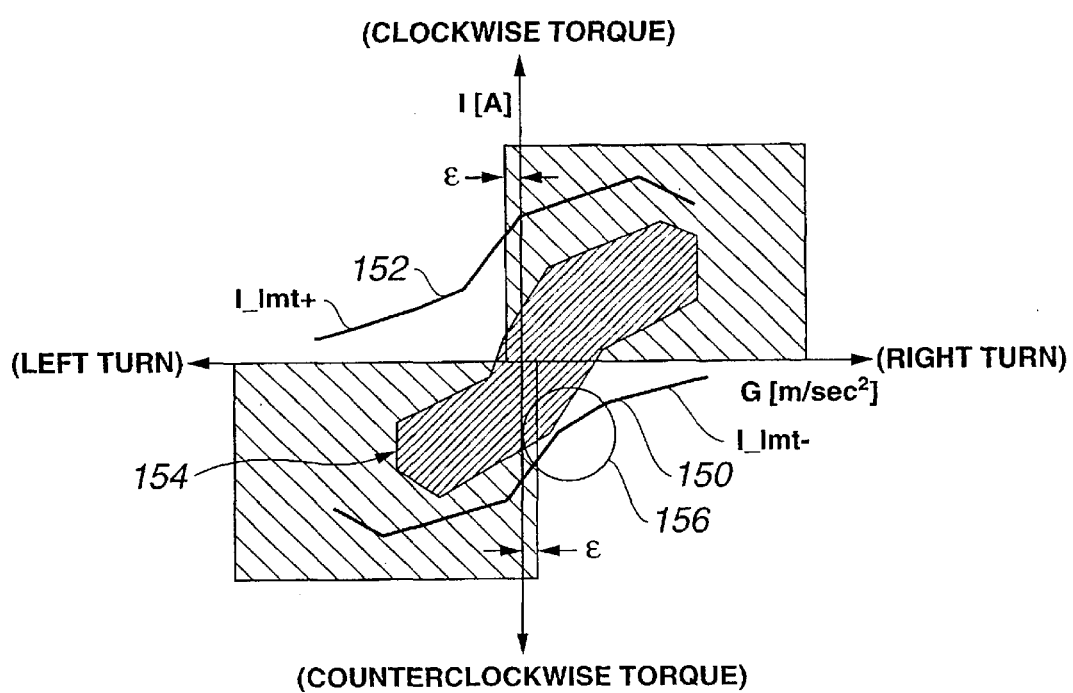
FIG. 11 is a similar view to FIG. 5 employing the first example of modified first and third quadrants shown in FIG. 9.

Referring to FIGS. 9 and 11, it will be appreciated that the illustrated modified first quadrant is different from the normal first quadrant shown in FIG. 5 in that it is deviated along the x-axis in the minus direction by an amount $\epsilon$ beyond the y-axis and may be defined as $-\epsilon \leq G$ and $0 \leq I\_cont$. The illustrated modified third quadrant is different from the normal third quadrant in that it is deviated along the x-axis in the plus direction by the amount $\epsilon$ beyond the y-axis and may be defined as $G \leq \epsilon$ and $I\_cont<0$. As will be seen from FIG. 11, the amount of deviation of such modified quadrants is determined so as to avoid the use of such undependable data within the circle 156.

Figure 10:
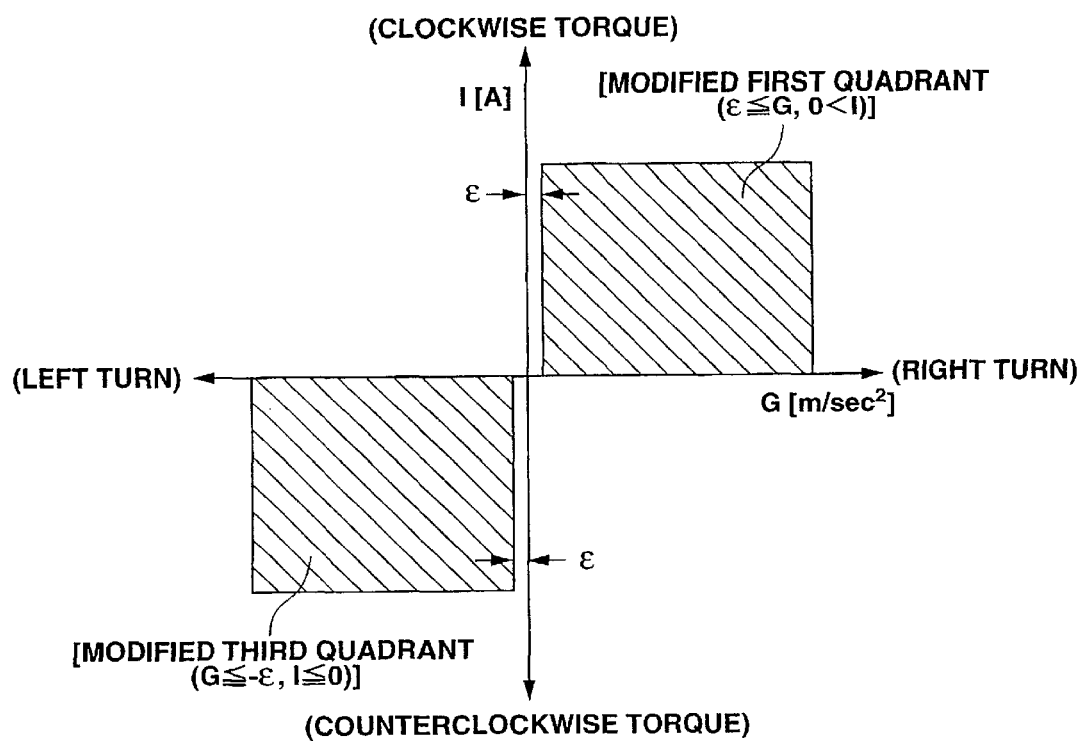
FIG. 10 is a two-dimensional coordinate system showing another example of modified first and third quadrants, which allow determination of driver intervention during map-correction when a current operating point falls therein.
Figure 12:
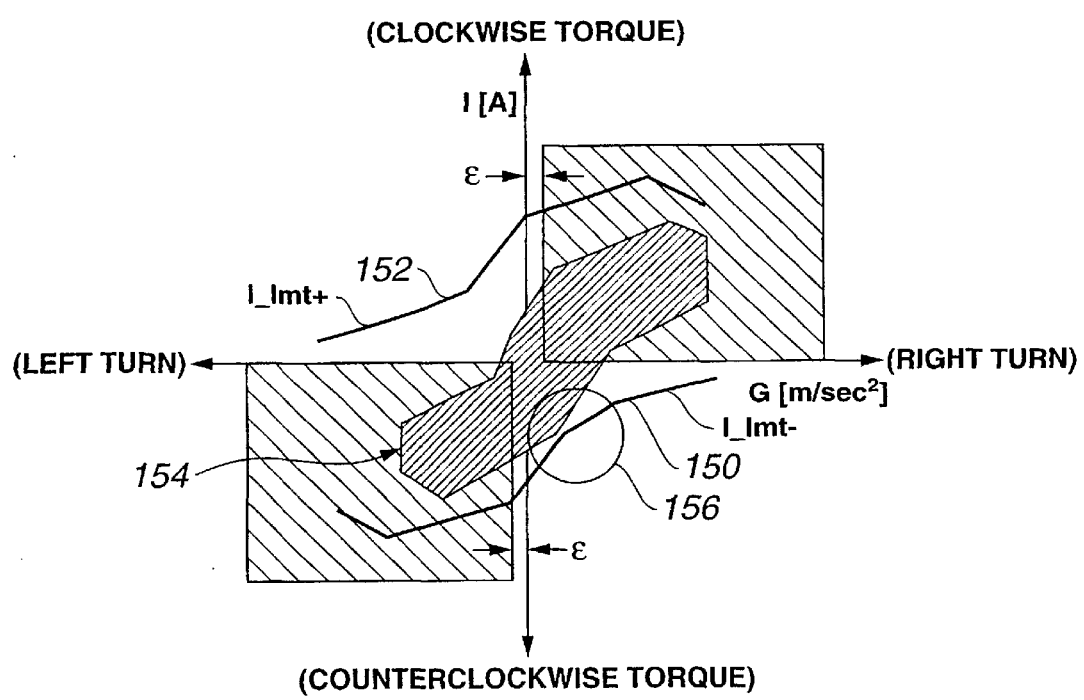
FIG. 12 is a similar view to FIG. 5 employing the second example of modified first and third quadrants shown in FIG. 10.

Referring next to FIG. 10 or 12, it will be appreciated that the illustrated modified first quadrant is different from the normal first quadrant shown in FIG. 5 in that it is deviated along the x-axis in the plus direction by an amount $\epsilon$ from the y-axis and may be defined as $\epsilon \leq G$ and $0 \leq I\_cont$. The illustrated modified third quadrant is different from the normal third quadrant in that it is deviated along the x-axis in the minus direction by the amount $\epsilon$ from the y-axis and may be defined as $G \leq -\epsilon$ and $I\_cont<0$. As will be seen from FIG. 12, the amount of deviation of such modified quadrants is determined so as to avoid the use of such undependable data within the circle 156.

Figure 8:
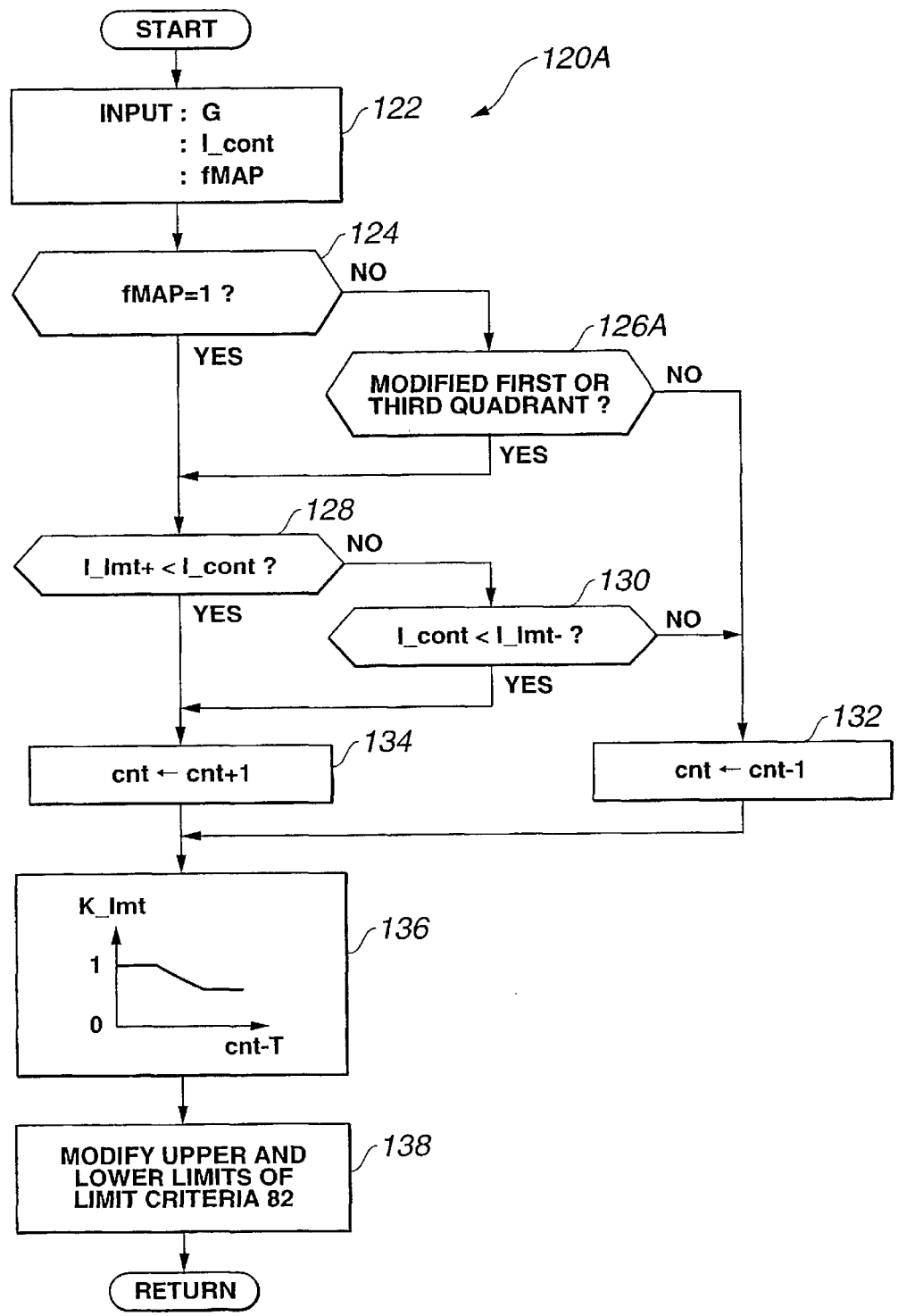
FIG. 8 is a block diagram similar to FIG. 3, showing a modification.

Referring to FIG. 8, a modified control routine, for determination of driver steering intervention and modification of upper and lower limits of limit criteria, is indicated generally at 120A. The control routine 120A is substantially the same as the previously described control routine 120 except the provision of block 126A in the place of the block 126 (see FIG. 3).

At block 126A, the modified first and third quadrants, as illustrated in FIGS. 9–12, are relied upon instead of the normal first and third quadrants (see FIG. 5) in selecting sufficiently reliable portions of the uncorrected limit data during the map-correction.

Briefly describing, as the map-correction is not yet completed, the instantaneous values of lateral acceleration G and actuator driver current command I_cont are compared to $-\epsilon$, $\epsilon$, and 0 (zero) to find whether or not one of the modified first and third quadrant in the two-dimensional coordinate system shown in FIG. 11 may be used to retrieve limit data (contour lines 152 and 150). If, at block 126A, it is determined that the modified first quadrant ($-\epsilon \leq G$ and $0 \leq I\_cont$) or the modified third quadrant ($G \leq \epsilon$ and $I\_cont<0$) may be used, the process goes from block 126A to block 128. Under this condition, the limit data within the modified first or third quadrant is retrieved to find an upper or lower limit value I_lmit+ or I_lmit–. If, at block 126A, it is determined the modified first and third quadrant may not be used, the process goes from block 126A to block 132. Until completion of map-correction, the portions of uncorrected or original limit data that are disposed within the modified first and third quadrants are used to provide the upper or lower limit value I_lmt+ or I_lmt– for processing at block 128 and onwards.

Figure 13:
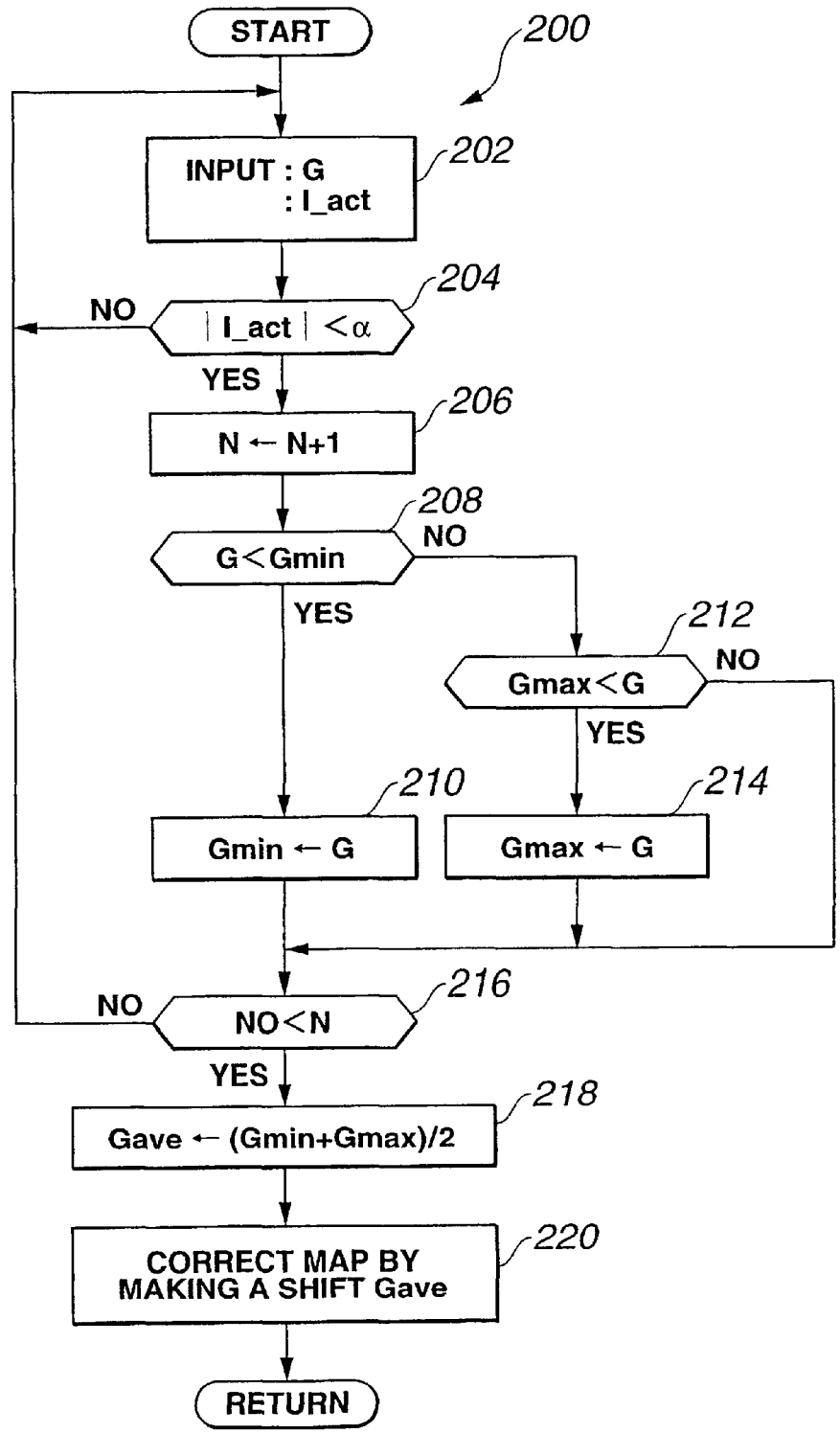
FIG. 13 is a block diagram illustrating another feature of the present invention.

Referring next to FIG. 13, a control routine for map-correction is generally indicated at 200.

In FIG. 13, at block 202, the instantaneous values of lateral acceleration G and actuator drive current I_act are received and stored. The instantaneous value of lateral acceleration G nay be obtained from the output of the vehicle mount lateral accelerometer or it may be obtained after estimation based on the vehicle lateral position in relation to lane markings and the output of steering angle sensor 38.

At the next block 204, it is determined whether or not predetermined condition is met in sampling data. At block 204, it is determined whether or not the absolute value of I_act is less than a value of $\alpha$. This value $\alpha$ may be selected from a range of values lying in the neighborhood of zero [A] as illustrated in FIG. 14. If, at block 204, the absolute value of I_act is less than $\alpha$ (yes), the process goes to block 206 and onwards. If, at block 204, the absolute value of I_act is not less than $\alpha$ (no), the process returns to the start point of the routine 200.

At block 206, increment of counter N is performed (N←N+1). Then, the process goes to block 208 and onwards.

At block 208, it is determined whether or not the instantaneous value of lateral acceleration G is less than the minimum value $G_{min}$. If this is the case (yes), the process goes to block 210. At block 210, this instantaneous value of lateral acceleration G is stored as the minimum value $G_{min}$.

If, at block 208, the instantaneous value of lateral acceleration is not less than the minimum value $G_{min}$ (no), the process goes to block 212. At block 212, it is determined whether or not the instantaneous value of lateral acceleration G is greater than the maximum value $G_{max}$. If this is the case (yes), the process goes to block 214. At block 214, this instantaneous value of lateral acceleration G is stored as the maximum value $G_{max}$. If the instantaneous value of lateral acceleration G falls in a range of values between the minimum and maximum values $G_{min}$ and $G_{max}$, the process goes from block 212 to block 216. In this case, the existing minimum and maximum values $G_{min}$ and $G_{max}$ are left unaltered.

After block 210 or 214, the process goes to block 216. At block 216, it is determined whether or not the counter N exceeds a predetermined number NO. This predetermined number NO is indicative of a sufficiently large number of sampled data required for the map-correction. If, at block 216, N is not greater than NO, the process returns to the start point of the routine 200. If, at block 216, it is determined that N is greater than NO, the process goes to block 218.

At block 218, using the obtained minimum and maximum values $G_{min}$ and $G_{max}$, an offset value $G_{ave}$ is obtained, which is expressed by the following formula:

$$G_{ave} \leftarrow (G_{min}+G_{max})/2 \qquad (7).$$

Figure 16:
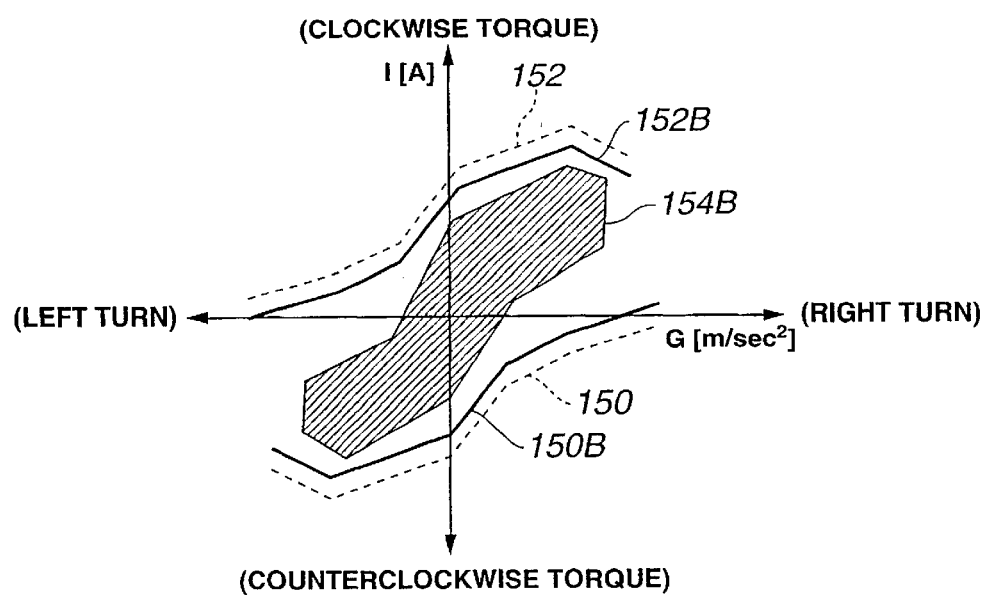
FIG. 16 is a similar view to FIG. 15, showing another example of corrected sets of limit data.

At block 220, a sub-routine for correcting the limit data of the map is executed using the offset value $G_{ave}$ by making a shift of such limit data along the x-axis by the offset value $G_{ave}$ as illustrated in FIG. 15. The direction of such shift in the map-correction is no limited to this example. If a shift is required along the y-axis, the upper limit data and the lower limit data should be shifted toward each other to the illustrated positions 152B and 150B to reduce the margin as illustrated in FIG. 16. Such map correction as illustrated in FIG. 16 may be needed to compensate for undesired effect due to aging and/or manufacturing variations of the vehicle components.

It will be appreciated by one ordinary skilled in the art that the various steps in the control routine 200 illustrate one preferred implementation of the map-correction function previously described in connection with block 98 shown in FIG. 2.

In the preceding description, the embodiments are explained based on the assumption that the map-correction is carried out once after the ignition source is turned on. Such map-correction may be carried out any time and at any number of times.

The manner of map-correction is not limited to that illustrated by routine 200. Any various different manners of map-correction may be employed as long as the purpose of such map-correction is to hold the appropriate margin between limit data and the periphery of a range (see shadowed area 154 in FIG. 5, for example) of values of current I_cont that may be produced by LKS control 78 during driving in LKS mode.

While the present invention has been particularly described in conjunction with the preferred embodiments, it is evident that many alternatives, modifications and variations will be apparent to those skilled in the art in light of foregoing description. It is therefore contemplated that the appended claims will embrace any such alternatives, modifications and variations as falling within the true scope and sprit of the present invention.

This application claims the priority of Japanese Patent Application No. P2000-377221, filed Dec. 12, 2000, the disclosure of which is hereby incorporated by reference in its entirety.

What is claimed is:

1. A method for lane-keeping control of a lane-keeping support system for assisting the driver steering action of a vehicle in following a target line between lane markings on a roadway, the method comprising:

producing a command indicative of steering torque assist needed to steer said vehicle in following said target line between said lane markings on a roadway during driving in lane-keeping control (LKC) mode;

providing a map having two sets of limit data against a range of values of lateral acceleration to which the vehicle is subject, between said sets of limit data there is a range of values of the command during various phases of steering the vehicle to turn in the LKC mode;

correcting the two sets of limit data in a manner to compensate for undesired effect caused by any deviation of the range of values of the command due to the presence of continuous disturbance; and comparing the instantaneous value of the command to two limit values established out of the corrected two sets of limit data in determining whether or not there is driver steering intervention.

2. The method as claimed in claim 1, wherein the correcting requires a period of time beginning with a first moment after power source for the system has been turned on and ending with a second moment, and further comprising comparing the instantaneous value of the command to at least one of said two limit values in determining the driver steering intervention, said at least one of the two limit values is established out of a portion of the two sets of limit data during a predetermined one of the phases of steering the vehicle to turn in the LKC mode.

3. The method as claimed in claim 2, wherein there is provided a two-level map-correction completion flag that shifts from one level to the other level upon ending of the period of time.

4. The method as claimed in claim 1, further comprising limiting the instantaneous value of the command between two limit values; and modifying the two limit values in response to determination of the driver steering intervention to reduce the steering torque assist to allow the driver steering intervention.

5. The method as claimed in claim 2, further comprising limiting the instantaneous value of the command between said two limit values; setting the two limit values established out of the two sets of limit data as the two limit values during the period of time; and modifying the two limit values in response to determination of the driver steering intervention to reduce the steering torque assist to allow the driver steering intervention.

6. The method as claimed in claim 4, wherein the steering torque assist reduces at a rate variable with elapse time after determination of the driver steering intervention.

7. The method as claimed in claim 2, further comprising comparing the instantaneous value of lateral acceleration to one of the first and second limit values to locate said portion of the two sets of limit data during the period of time.

8. The method as claimed in claim 7, wherein the first and second limit values are equal to each other and zero.

9. The method as claimed in claim 7, wherein the first and second limit values are deviated from zero in the opposite directions.

10. The method as claimed in claim 1, wherein the correcting includes sampling a predetermined number of the instantaneous values of lateral acceleration when the actual values of steering torque assist are less deviated from zero than a predetermined value, and determining the maximum value and the minimum value out of the sampled predetermined number of the instantaneous values of lateral acceleration, calculating an offset value using the determined maximum and minimum values; and using the offset value in correcting the two sets of limit data.

* * * * *